US011362315B2

(12) United States Patent
Bonhomme et al.

(10) Patent No.: US 11,362,315 B2
(45) Date of Patent: Jun. 14, 2022

(54) TRANSFER LAMINATION OF ELECTRODES IN SILICON-DOMINANT ANODE CELLS

(71) Applicant: ENEVATE CORPORATION, Irvine, CA (US)

(72) Inventors: Fred Bonhomme, Lake Forest, CA (US); Benjamin Park, Mission Viejo, CA (US); Kirk Shockley, Irvine, CA (US); Giulia Canton, Irvine, CA (US); David J. Lee, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 4 days.

(21) Appl. No.: 17/134,764

(22) Filed: Dec. 28, 2020

(65) Prior Publication Data
US 2021/0119198 A1 Apr. 22, 2021

Related U.S. Application Data

(63) Continuation of application No. 16/681,641, filed on Nov. 12, 2019, now Pat. No. 10,879,522.

(60) Provisional application No. 62/854,935, filed on May 30, 2019.

(51) Int. Cl.
H01M 4/00 (2006.01)
H01M 4/04 (2006.01)
H01M 4/1395 (2010.01)
H01M 4/134 (2010.01)
H01M 4/133 (2010.01)
H01M 4/1393 (2010.01)
H01M 4/02 (2006.01)

(52) U.S. Cl.
CPC ....... *H01M 4/0471* (2013.01); *H01M 4/0404* (2013.01); *H01M 4/0409* (2013.01); *H01M 4/0435* (2013.01); *H01M 4/133* (2013.01); *H01M 4/134* (2013.01); *H01M 4/1393* (2013.01); *H01M 4/1395* (2013.01); *H01M 2004/027* (2013.01)

(58) Field of Classification Search
CPC .......... H01M 4/00; H01M 4/04; H01M 4/047; H01M 4/0471; H01M 4/043; H01M 4/0435; H01M 4/10; H01M 4/13; H01M 4/134; H01M 4/139; H01M 4/1395
See application file for complete search history.

(56) References Cited

U.S. PATENT DOCUMENTS

| 5,558,954 A * | 9/1996 | Morrison | H01M 4/587 423/447.4 |
| 2002/0058179 A1 * | 5/2002 | Segit | H01M 4/663 429/530 |
| 2014/0295290 A1 * | 10/2014 | Park | H01M 4/366 156/60 |

* cited by examiner

*Primary Examiner* — Jacob T Minskey
*Assistant Examiner* — Matthew Hoover
(74) *Attorney, Agent, or Firm* — McAndrews, Held & Malloy, Ltd.

(57) ABSTRACT

Systems and methods are provided for high volume roll-to-roll transfer lamination of electrodes for silicon-dominant anode cells.

9 Claims, 11 Drawing Sheets

TRANSFER LAMINATION OF ELECTRODES IN SILICON-DOMINANT ANODE CELLS

CLAIM OF PRIORITY

This patent application is a continuation of U.S. patent application Ser. No. 16/681,641, filed on Nov. 12, 2019, which in turn makes reference to, claims priority to and claims benefit from U.S. Provisional Patent Application Ser. No. 62/854,935, filed on May 30, 2019. The above identified application is hereby incorporated herein by reference in its entirety.

TECHNICAL FIELD

Aspects of the present disclosure relate to energy generation and storage. More specifically, certain implementations of the present disclosure relate to methods and systems for transfer lamination of electrodes in silicon-dominant anode cells.

BACKGROUND

Various issues may exist with conventional battery technologies. In this regard, conventional systems and methods, if any existed, for designing and making battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for transfer lamination of electrodes in silicon-dominant anode cells, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
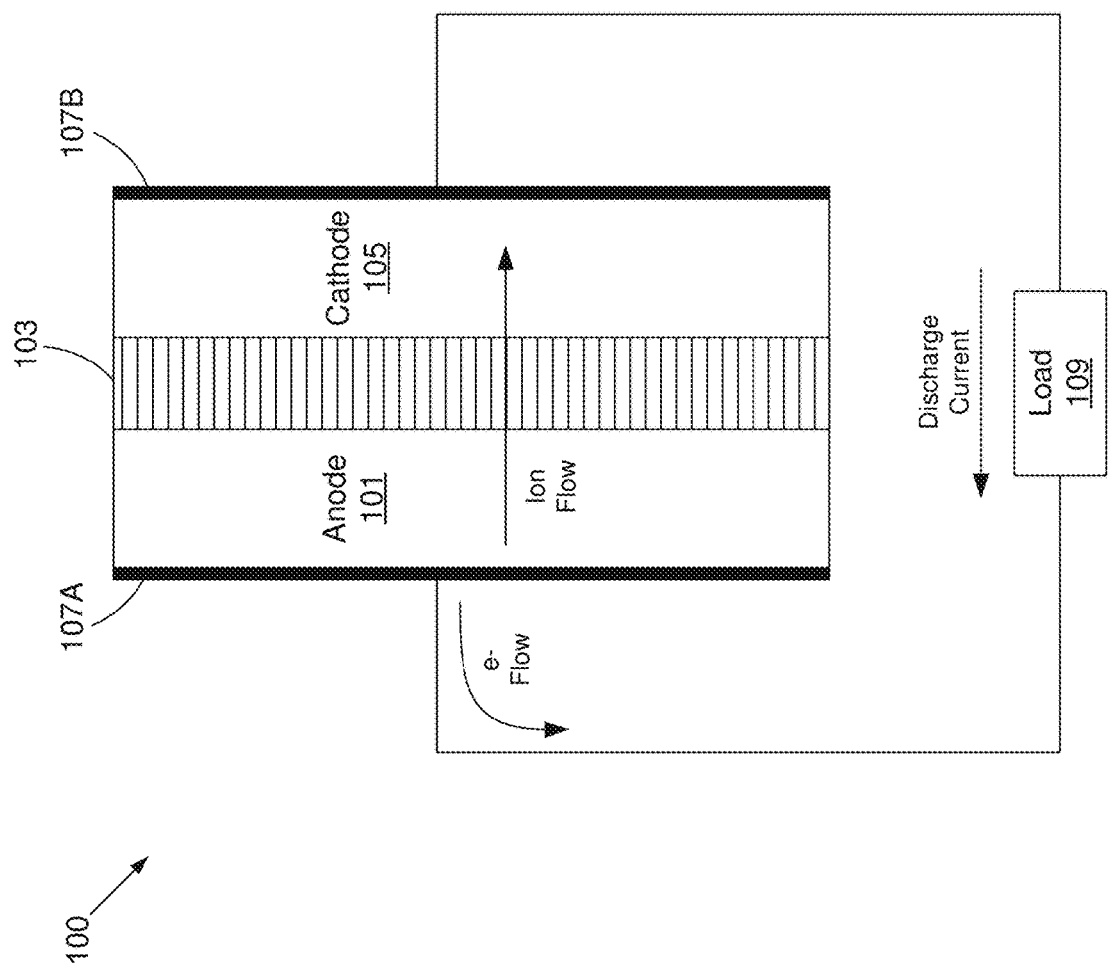
FIG. 1 is a diagram of a battery with silicon-dominated anode, in accordance with an example embodiment of the disclosure.

FIG. 1 is a diagram of a battery with silicon-dominated anode, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. $Li/Li^+$, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Figure 2:
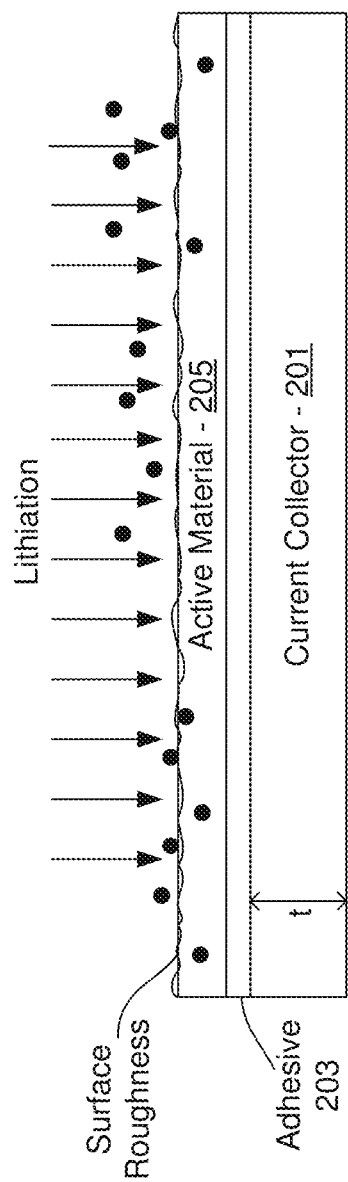
FIG. 2 illustrates an example silicon-dominant anode, in accordance with an example embodiment of the disclosure.

FIG. 2 illustrates an example silicon-dominant anode, in accordance with an example embodiment of the disclosure. Shown in FIG. 2 are a current collector 201, an optional adhesive 203, and an active material 205. It should be noted, however, that the adhesive 203 may or may not be present depending on the type of anode fabrication process utilized, as the adhesive is not necessarily present in a direct coating process where the active material is formed directly on the current collector.

In an example scenario, the active material 205 before pyrolysis comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium particles impinging upon and lithiating the active material 205. As illustrated in FIG. 2, the current collector 201 has a thickness t, which may vary based on the particular implementation. In this regard, in some implementations thicker foils may be used while in other implementations thinner foils are used. Example thicker foils may be greater than 6 μm, such as 10 μm or 20 μm for copper, for example, while thinner foils may be less than 6 μm thick in copper In an example scenario, when an adhesive is used, the adhesive 203 comprises a polymer such as polyimide (PI) or polyamide-imide (PAI) that provides adhesive strength of the active material film 205 to the current collector 201 while still allowing electrical contact to the current collector 201. Other adhesives may be utilized depending on the desired strength, as long as they can provide adhesive strength with sufficient conductivity following processing.

Figure 3:
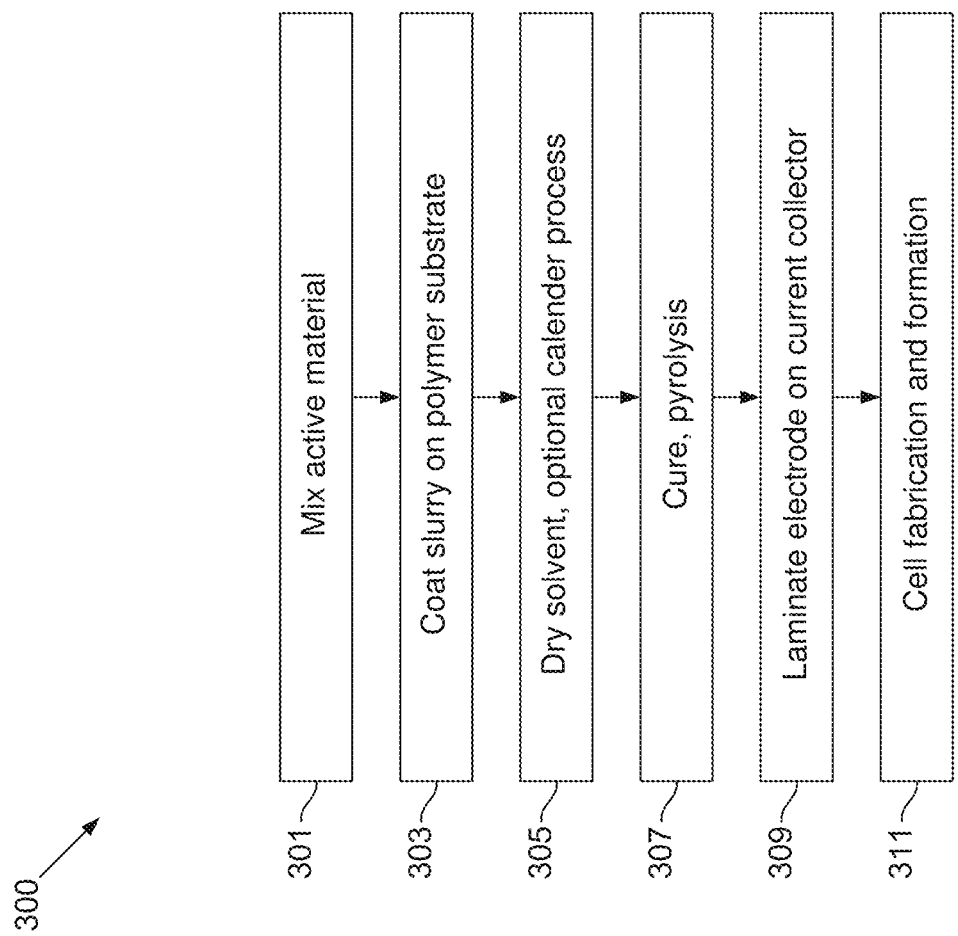
FIG. 3 is a flow diagram of an alternative process for transfer lamination of electrodes, in accordance with an example embodiment of the disclosure.

FIG. 3 is a flow diagram of an alternative process for transfer lamination of electrodes, in accordance with an example embodiment of the disclosure. This process comprises physically mixing electrode active material, conductive additive, and binder together coupled with pyrolysis and transfer lamination processes.

This process is shown in the flow diagram of FIG. 3, starting with step 301 where the active material may be mixed with a binder/resin such as polyimide (PI) or polyamide-imide (PAI), solvent, the silosilazane additive, and optionally a conductive carbon. For example, graphene/VGCF (1:1 by weight) may be dispersed in NMP under sonication for, e.g., 45-75 minutes followed by the addition of Super P (1:1:1 with VGCF and graphene) and additional sonication for, e.g., 1 hour. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 303, the slurry may be coated on a substrate, such as copper, titanium, chromium, graphite, nickel, stainless steel, tungsten, etc. The slurry may be coated on the substrate film at a loading of 1.5-5 mg/cm$^2$ (with 15% solvent content), and then dried to remove a portion of the solvent in step 305. An optional calendering process may be utilized where a series of hard pressure rollers may be used to finish the film/substrate into a smoothed and denser sheet of material.

The coating may be followed by a cure and pyrolysis step 307, where the film may be thermally treated (optionally after drying it first) at 500-1300° C. to convert the polymer matrix into carbon. The pyrolysis step may result in an anode active material having silicon content greater than or equal to 50% by weight, where the anode has been subjected to heating at or above 400 degrees Celsius.

In step 309, the pyrolyzed material may be transfer laminated from the substrate on the current collector (e.g., using flat press or roll press), where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 311, the electrode may then be sandwiched with a separator and cathode with electrolyte to form a cell. The cell may be subjected to a formation process, comprising initial charge and discharge steps to lithiate the anode, with some residual lithium remaining. In some instances, expansion of the anode may be measured to confirm reduced expansion and anisotropic nature of the expansion. The larger silicon particle size results in a rougher surface, higher porosity and less dense material, which reduces the expansion of the active material during lithiation.

Figure 4:
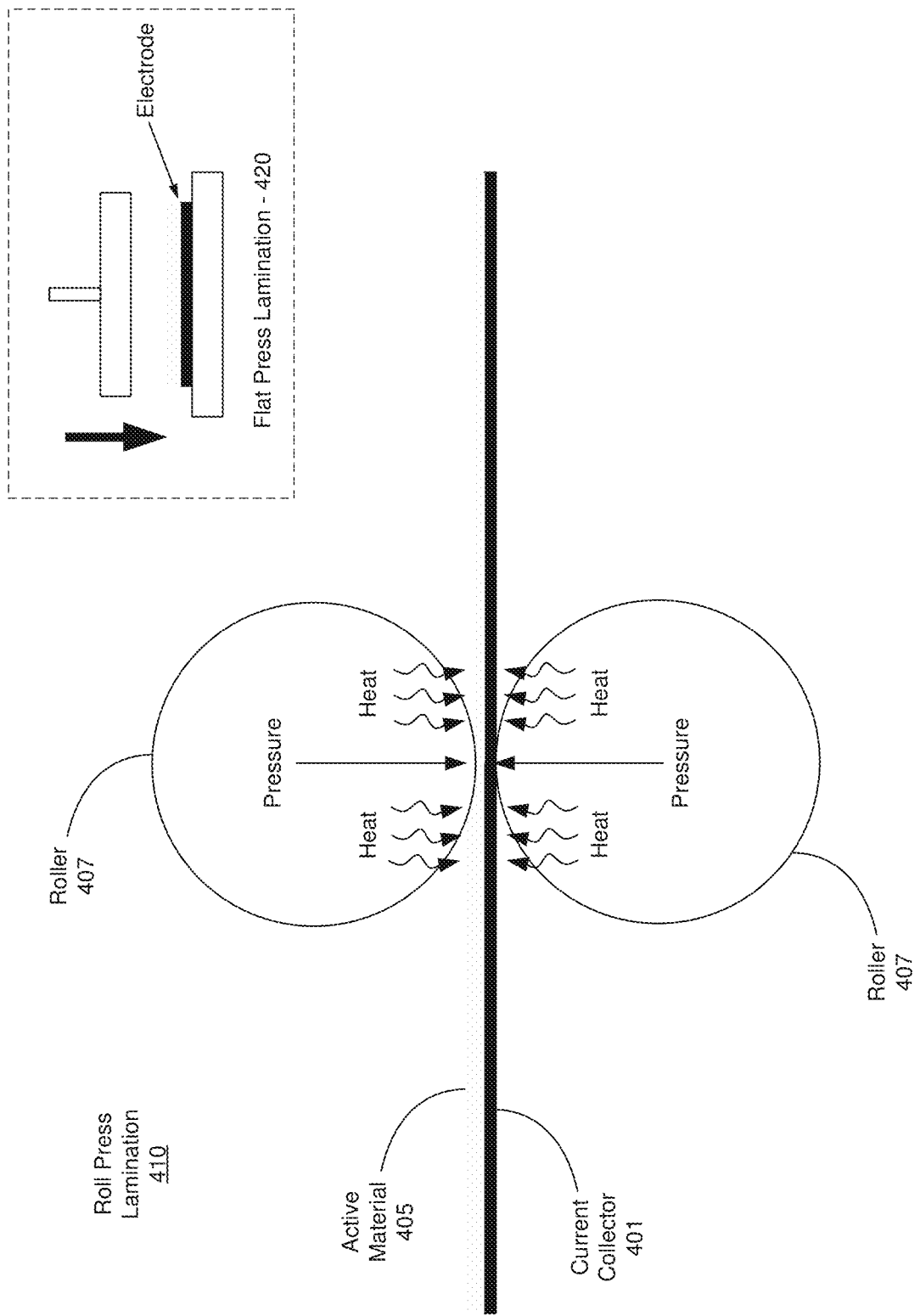
FIG. 4 illustrates roll press and flat press of anode active material, in accordance with an example embodiment of the disclosure.

FIG. 4 illustrates roll press and flat press of anode active material, in accordance with an example embodiment of the disclosure. Referring to FIG. 4, there is shown roll press lamination 410 and flat press lamination 420.

In roll press lamination 410, a current collector 401 and active material 405 may be roll pressed using a pair of rollers 407. The current collector 401 and the active material 405 may be similar to the current collector 201 and active material 205 described with respect to FIG. 2. The rollers 407 may comprise rigid cylindrical structures for applying a configurable pressure to material passed between them in a lamination process. Further, heat may be applied to the materials being laminated, such as using heating elements in the rollers 407 (as shown in FIG. 4), or from external heat sources.

In flat press lamination 420, flat surfaces are pressed together to apply pressure to the electrode layers. The roll press lamination process thus has variables of pressure and temperature.

It should be noted that while FIG. 4 shows active material on one side, the disclosure is not so limited, as the roll press process applies to double-sided foils too. An example of such implementation is shown in FIG. 5.

In some instances, scaling electrode production may be desirable. Electrode processing solutions that allow for continuous and speedy manufacturing may be particularly suitable for facilitating high volume electrode production. For example, roll press may be used, as it may be particularly suitable for continuous and speedy processing, as described below.

Figure 5:
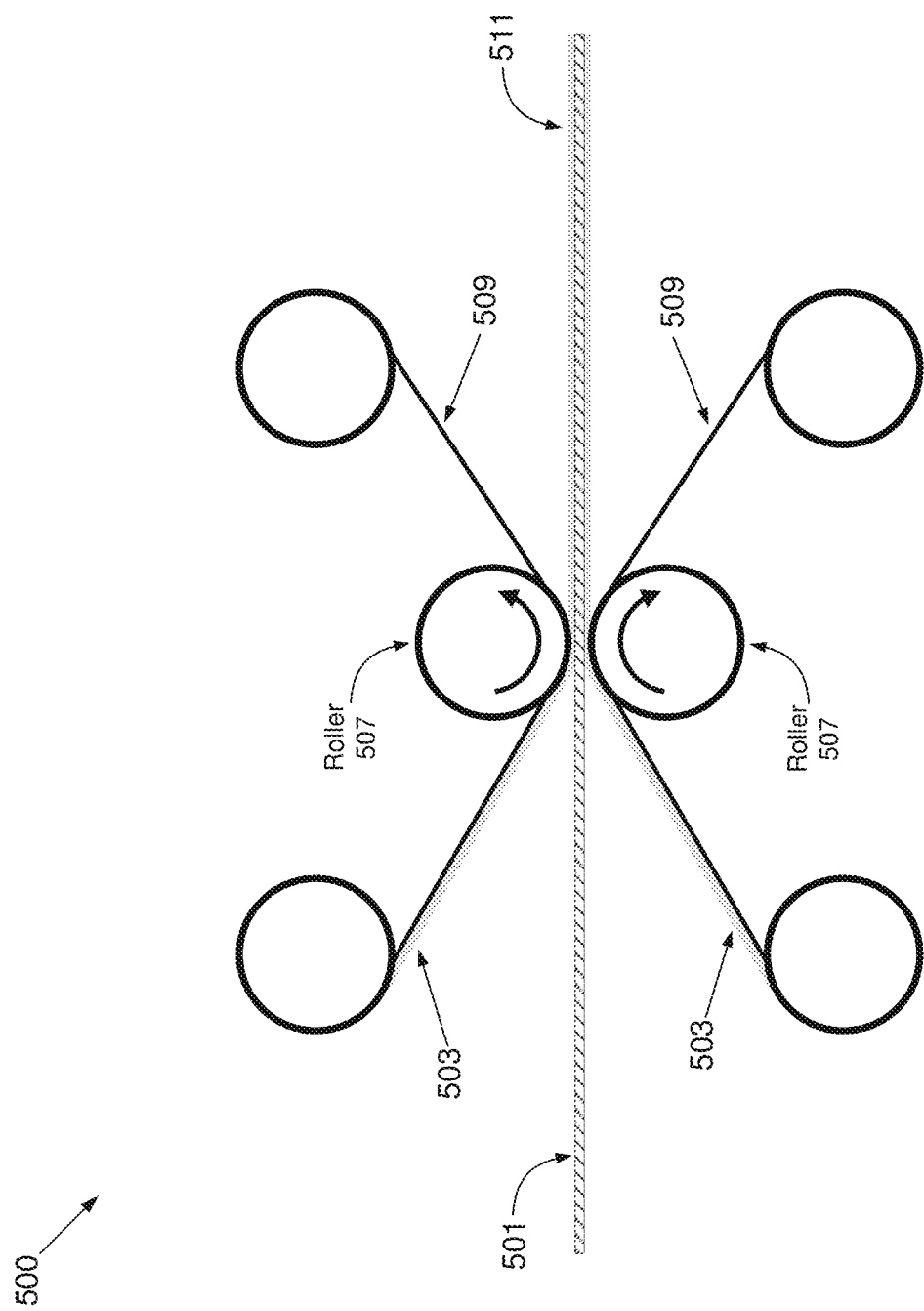
FIG. 5 illustrates two-sided roll press of anode active material, in accordance with an example embodiment of the disclosure.

FIG. 5 illustrates an example system for double-sided roll press of anode active material, in accordance with an example embodiment of the disclosure. Shown in FIG. 5 is a roll-to-roll system 500 configured for double-sided roll press lamination.

In this regard, as shown in FIG. 5, two rolls may be used to feed two separate single-side coated and pyrolyzed electrode composite material films on corresponding carriers 503, which are then rolled processed on the two sides of a current collector 501 using pair of rollers 507. The rollers 507 may be substantially similar to the rollers 407, but may be configured for supporting double-sided press roll. In this regard, the current collector 501 is fed in between and lined up with the pyrolyzed electrode composite material films on carriers 503 through the rollers 507, which may rotate in opposite directions (as shown in FIG. 5).

As the lined up composite material films 503 and the current collector 501 pass through the rollers 507, the composite material films are peeled off or detached from the carrier films 509, and attached (i.e., laminated) to both sides of the current collector 501, resulting in double-sided laminated electrode 511. The carrier films 509 may be rolled and reused.

In some instances, scaling electrode production may be desirable. Accordingly, various implementations in accordance with the present disclosure provide processes and corresponding apparatuses configured for high volume electrode production, particularly being configured for processing silicon-dominant anodes, based on carbonized polymer as the mechanical structure, in continuous electrode form.

In this regard, the mechanical integrity of the electrode web may be maintained during the entire process. In order to maximize performance of the silicon-dominant anode based on conversion into carbon of a polymer matrix, complete carbonization of the polymer (requires >500° C. temperature), good cohesion of the active material film, and good adhesion of the active material film to the current collector should be achieved. Examples of such processes and/or corresponding systems are described with respect to FIG. 6-11.

Figure 6:
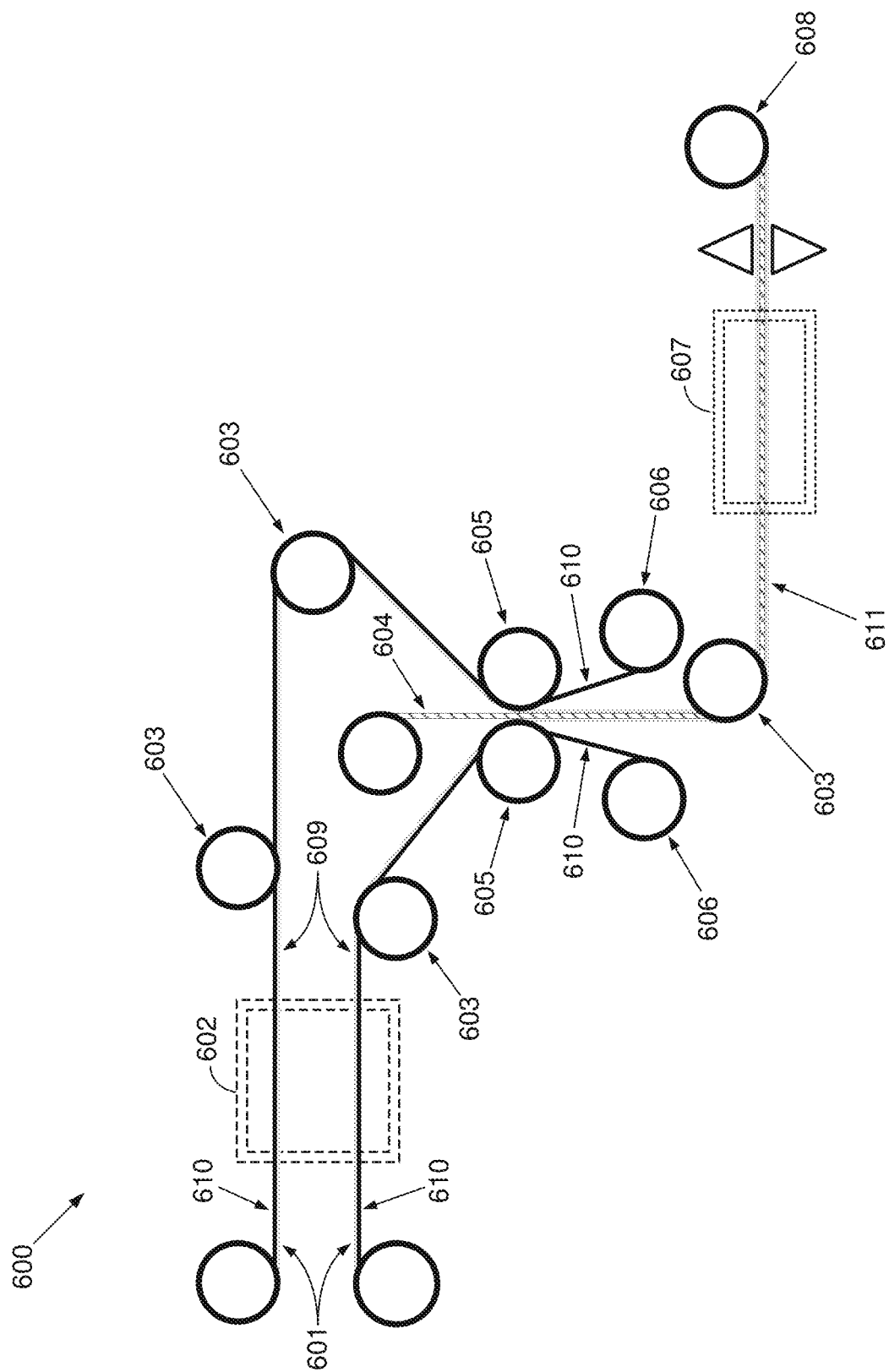
FIG. 6 illustrates an example high volume roll-to-roll electrode lamination based system, in accordance with an example embodiment of the disclosure.

FIG. 6 illustrates an example high volume roll-to-roll electrode lamination based system, in accordance with an example embodiment of the disclosure. Shown in FIG. 6 is system 600, which may be used for high volume roll-to-roll electrode lamination.

In this regard, an example process for providing high volume electrode lamination (as implemented in FIG. 6) may include coating an electrode mixture, comprising active material and polymer, onto a substrate and submit the resulting assembly to heat-treatment/pyrolysis (e.g., a temperature >500° C., in an inert or reducing atmosphere). This results in an active material film deposited on the substrate with a weak adhesion. The material that can be used as a substrate (also referred to as carrier film) for the heat treatment process are copper, titanium, chromium, graphite, or nickel. The active material film is then transferred from the original substrate to an adhesive coated current collector (e.g., a copper foil) by a lamination process at a configured temperature and pressure. The entire process can be conducted as roll to roll, in similar manner as described with respect to FIG. 5.

For example, in the implementation illustrated in FIG. 6, a mixture of active material and binder/resin/polymer (referred to as "precursor composite film") may initially be coated onto a substrate (e.g., carrier film) 610, with a weak adhesion, and go through drying and curing stages to form a precursor composite film 601 on carrier film 610. The carrier film 610 may be a metal film made from metals such as copper, titanium, chromium, graphite, nickel, stainless steel, tungsten, etc. The disclosure is not limited to metal based carrier films, however, and other types may be used. For example, in some embodiments, a carrier film may be a ceramic film, a carbon or carbide-based film, or may be made of a glass, quartz, or silica product.

The precursor composite film 601 on film 610 is fed through a heat treat (pyrolysis) oven 602, and the precursor composite film is pyrolyzed on the carrier film as it moves through the heat treat oven 602, to convert the precursor to carbon, resulting in a pyrolyzed composite film 609 on the carrier film 610. In this regard, the pyrolysis may be conducted at temperature >500° C., in a reducing atmosphere. For example, an inert atmosphere, a vacuum and/or flowing argon, nitrogen, or helium gas may be used.

Figure 7:
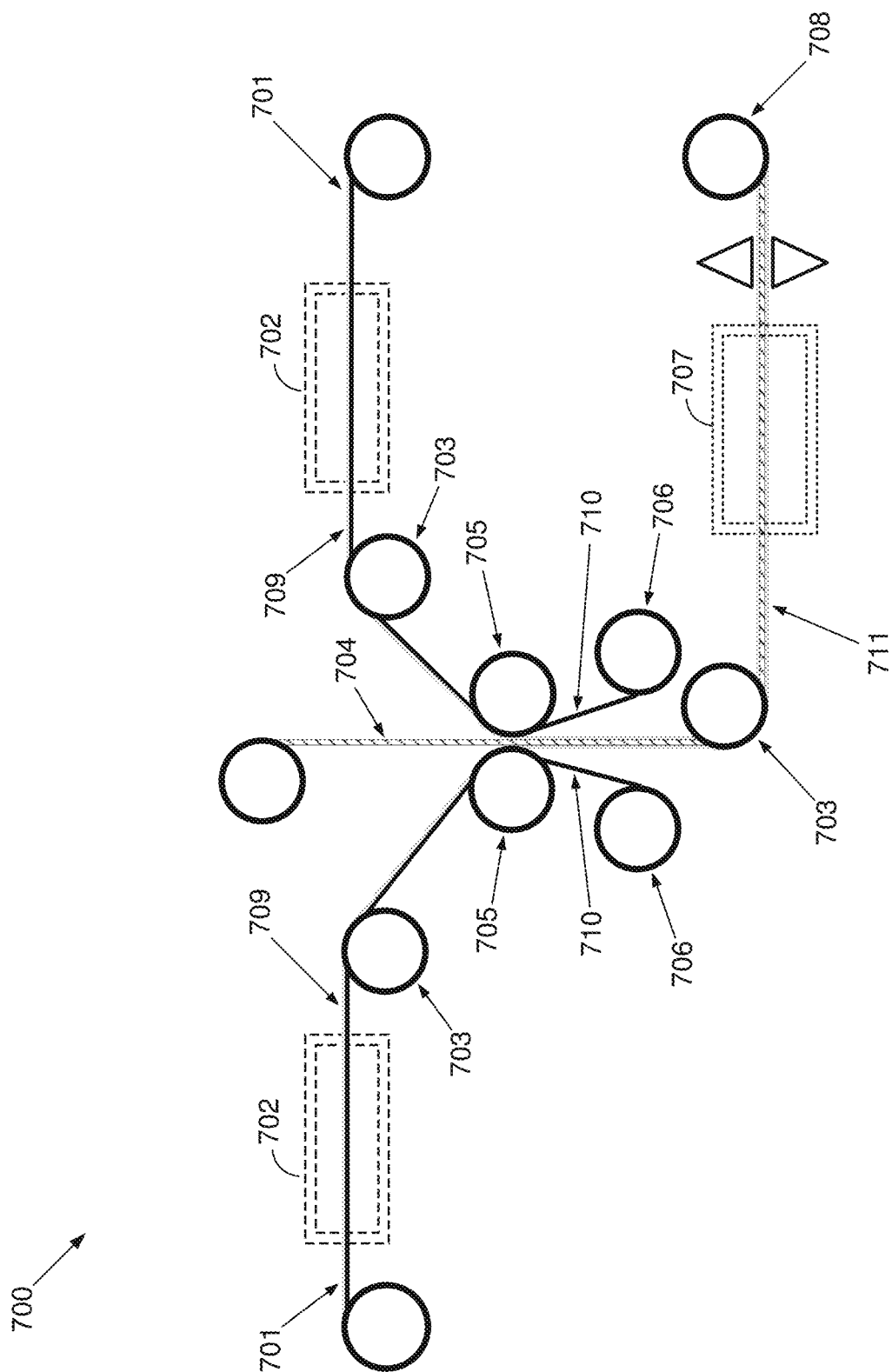
FIG. 7 illustrates another example high volume roll-to-roll electrode lamination based system, in accordance with an example embodiment of the disclosure.

In some embodiments, precursor composite films on two carrier films may go through the system 600 simultaneously, including being pyrolyzed at the same time in the same or different heat treat oven(s). In the implementation shown in FIG. 6, the same oven is used for two precursor composite films on two carrier films, whereas FIG. 7 illustrates an implementation with two different ovens.

Following the pyrolysis step, two carrier films 610, the pyrolyzed composite films 609 on them, may go through a set of rollers 603 that put a space between the two carrier films 610, allowing a current collector 604 to be introduced to the system 600. The current collector 604 is fed in between and lined up with the pyrolyzed composite material films 611 on the two carrier film lines 610 through a set of rollers 605, which are similar to the rollers 507 of FIG. 5.

Thus, the rollers 605 perform roll-to-roll lamination press at configured temperature and pressure as the lined up pyrolyzed composite films 609 and the current collector 604 pass through them. In this regard, the pyrolyzed composite films 609 are peeled off or detached from the carrier films 610, and attached (i.e., laminated) to both sides of the current collector 604, resulting in double-sided composite electrode film 611.

Optionally, the composite electrode film 611 (comprising the pyrolyzed composite material films 609 attached to both sides of the current collector 604) may be cleaned and inspected as they go through a clean and inspection station 607. The composite electrode film 611 may then be rolled up into an electrode roll 608 for making batteries.

In some embodiments, the length of heat treat oven 602 may be about 12 m to about 18 m, preferably about 14 m, and the amount of time a specific location on the film stays in the heat treat oven may be about 1 min to about 40 min, about 1.5 min to about 30 min, about 1.2 min to about 6 min, preferably about 1.5 min. The heat treat speed and the lamination speed are about 1 m/min to about 100 m/min, about 8 m/min to about 12 m/min, preferably about 10 m/min.

FIG. 7 illustrates another example high volume roll-to-roll electrode lamination based system, in accordance with an example embodiment of the disclosure. Shown in FIG. 7 is system 700, which may be used for high volume roll-to-roll electrode lamination. The system 700 is substantially similar to the system 600 described with respect to FIG. 6. The system 700 uses, however, multiple pyrolysis ovens.

For example, in the implementation illustrated in FIG. 7, two precursor composite films 701 (similar to the precursor composite films 601 of FIG. 6) on carrier films 710 (similar to the carrier films 610 of FIG. 6) are fed through two separate heat treat (pyrolysis) ovens 702 (each of which is similar the oven 602 of FIG. 6), and the precursor composite films are separately pyrolyzed on the carrier films as they move through the heat treat ovens 702. The pyrolysis is performed in similar manner as described with respect to FIG. 6.

Following the pyrolysis step, two carrier films 710, the pyrolyzed composite films 709 on them, may go through a set of rollers 703 that put a space between the two carrier films 710, allowing a current collector 704 to be introduced to the system 700. The current collector 704 is fed in between and lined up with the pyrolyzed composite material films 709 on the two carrier film lines 710 through a set of rollers 705, which are similar to the rollers 507 of FIG. 5. Thus, the rollers 705 perform roll-to-roll lamination press at configured temperature and pressure as the lined up pyrolyzed composite films 709 and the current collector 704 pass through them. In this regard, the pyrolyzed composite films 709 are peeled off or detached from the carrier films 710, and attached (i.e., laminated) to both sides of the current collector 704, resulting in double-sided composite electrode film 711.

The composite electrode film 711 (comprising the pyrolyzed composite material films 709 attached to both sides of the current collector 704) may be cleaned and inspected via the clean and inspection station 707. The composite electrode film 711 may then be rolled up into an electrode roll 708 for making batteries.

Figure 8:
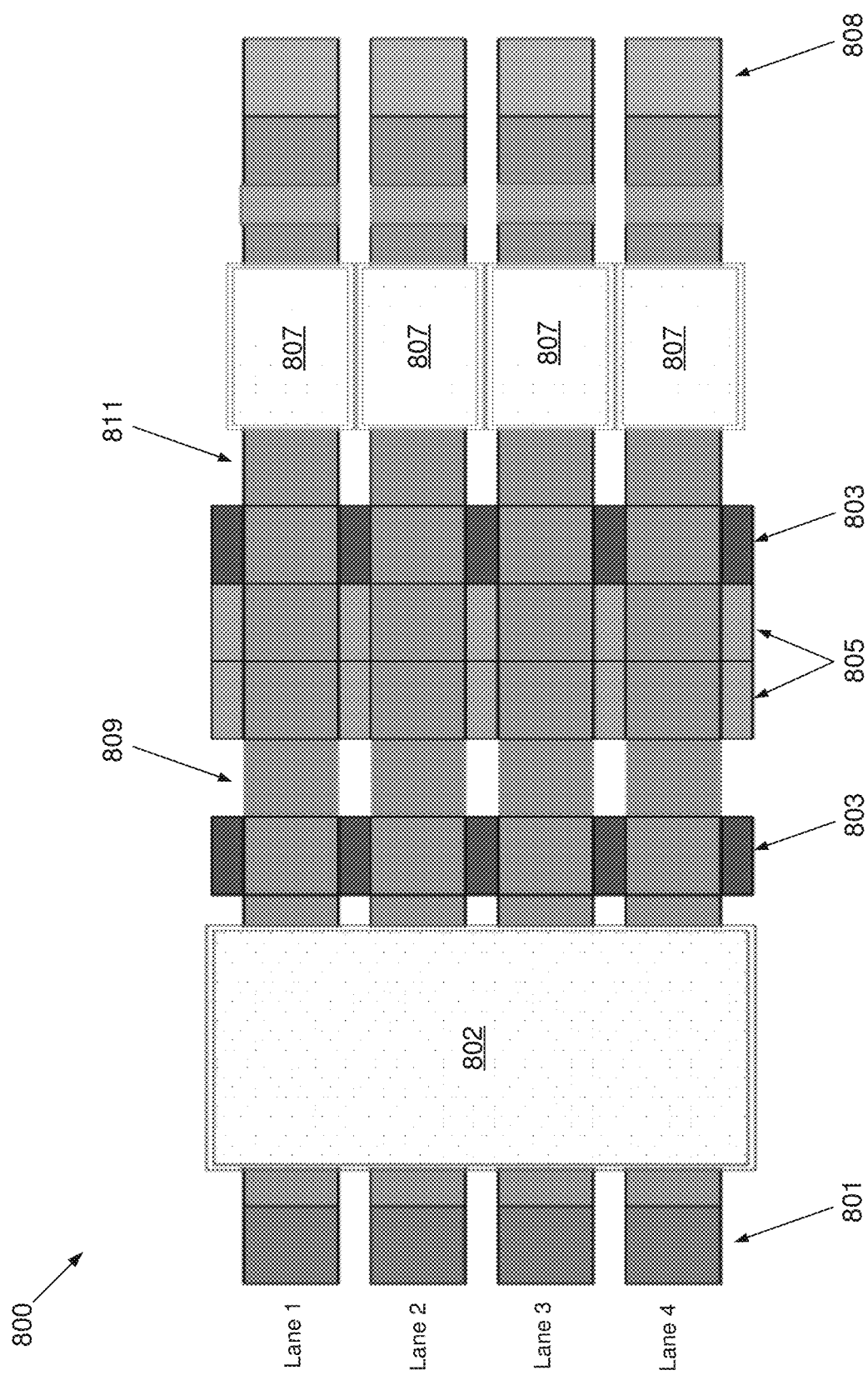
FIG. 8 illustrates a top view of an example roll-to-roll system with multiple manufacturing lanes, in accordance with an example embodiment of the disclosure.

FIG. 8 illustrates a top view of an example roll-to-roll system with multiple manufacturing lanes, in accordance with an example embodiment of the disclosure. Shown in FIG. 8 is system 800, which may be used for high volume roll-to-roll electrode lamination using manufacturing lanes.

In this regard, in some embodiments, to further increase volumes, multiple lanes of manufacturing lines may be set up or used in a lamination based system, such as to simultaneously produce multiple composite electrode rolls. For example, as shown in FIG. 8, such system may incorporate four lanes, each based on a single-lane implementation, such as one similar to the system shown in FIG. 6 or FIG. 7. In some instances, however, some of the components may be combined (or a single component may be used for all of the manufacturing lanes).

For example, as shown in FIG. 8, the system 800 may use 8 separate rolls feeding 4 pairs of precursor composite films 801 (similar to the precursor composite films 601 and 701 of FIGS. 6 and 7) on 8 corresponding carrier films (each similar to the carrier films 610 and 710 of FIGS. 6 and 7). In this regard, as the top view of the system is shown in FIG. 8, only the top film in each lane is shown. A single oven 802, which may be substantially similar to the ovens films 602 and 702 of FIGS. 6 and 7 (but configured for, e.g., applying pyrolysis to 8 different films) is then used to heat treat all of the precursor composite films 801, resulting in 8 corresponding pyrolyzed films 809 (similar to the pyrolyzed films 609 and 709 of FIGS. 6 and 7).

The pyrolyzed films 809 are then moved using rollers 803 (similar to pyrolyzed films 603 and 703 of FIGS. 6 and 7), which may also create space to allow introducing 4 corresponding current collectors (not shown), and these components are then pressed via rollers 805 (similar to rollers 605 and 705 of FIGS. 6 and 7) to create 4 corresponding double-sided composite electrode films 811 (similar to electrode films 611 and 711 of FIGS. 6 and 7), each comprising two pyrolyzed composite material films 809 attached to both sides of the current collector 704.

The composite electrode films 811 (comprising the pyrolyzed composite material films 809 attached to both sides of the current collectors) may be cleaned and inspected via 4 corresponding clean and inspection stations 807 (similar to electrode stations 607 and 707 of FIGS. 6 and 7). The composite electrode films 811 may then be rolled up into 4 individual electrode rolls 808.

While not specifically shown in FIGS. 6-9, the systems illustrated and described therein include components (e.g., hardware components, circuitry, etc.) for supporting various functions performed in these systems. The systems may incorporate, for example, suitable components (e.g., sensors, control circuitry, etc., not shown) for providing sensory and control functions for monitoring operations of the systems. The systems may also incorporate input/output subsystems (e.g., input devices, output devices, circuitry, etc.) for supporting and/or facilitating user interactions with the systems.

To ensure quality of electrodes produced using high volume roll-to-roll lamination based processes, cells incorporating such electrodes and performance thereof may be compared against baseline cells—e.g., cells produced using baseline process, such as continuous batch process. In this regard, the baseline process includes forming a precursor composite film on a carrier film, peeling the precursor composite film off the carrier, cutting the precursor composite film into appropriate size for an electrode, pyrolyzing the cut precursor composite film pieces, and then placing the pyrolyzed pieces on both sides of a copper foil coated with a layer of polyamide-imide (PAI).

For example, with respect to cell energy density, the cell energy densities of cells produced using electrodes made by high volume roll-to-roll lamination based processes compare favorably to cells incorporating electrode made by baseline continuous batch process. This is illustrated in Table 1, which shows example energy densities of 5 L cells, and Table 2, which shows example modeled energy densities of an EV cell (550×100 mm):

TABLE 1

|  | Baseline continuous batch process | Roll-to-roll transfer lamination process |
|---|---|---|
| 4.2 V-2.75 V (0% SOC) | 598 Wh/L | 598-639 Wh/L |
| 4.2 V-2.75 V (100% SOC) | 556 Wh/L | 556-598 Wh/L |

TABLE 2

|  | Baseline continuous batch process | Roll-to-roll transfer lamination process |
|---|---|---|
| 4.2 V-2.75 V (0% SOC) | 984 Wh/L | 984-1022 Wh/L |
| 4.2 V-2.75 V (100% SOC) | 911 Wh/L | 911-946 Wh/L |

Figure 9:
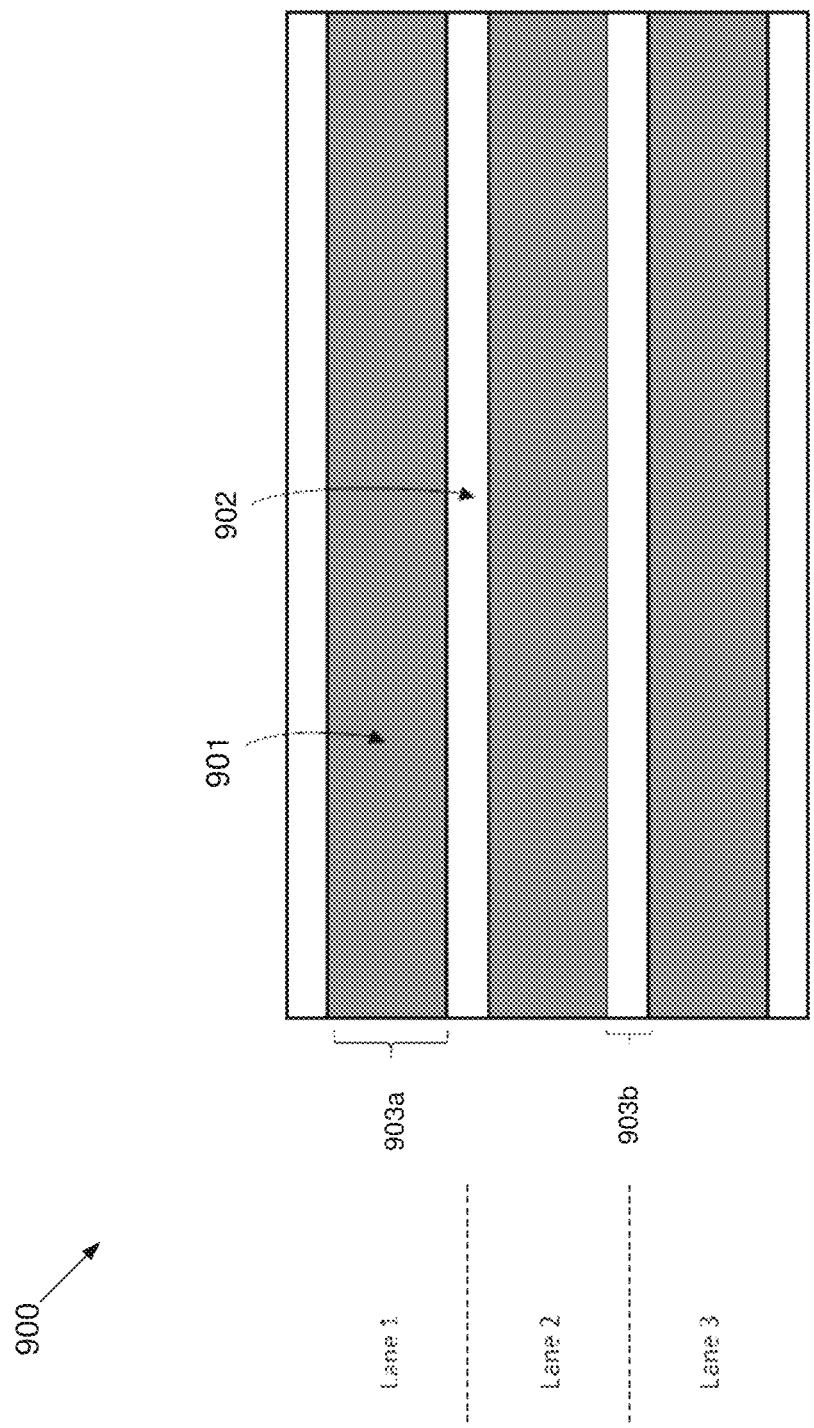
FIG. 9 illustrates a top view of an embodiment of an electrode roll with multiple mixture strips on a single current collector, in accordance with an example embodiment of the disclosure.

FIG. 9 illustrates a top view of an embodiment of an electrode roll with multiple mixture strips on a single current collector, in accordance with an example embodiment of the disclosure.

In this regard, in some embodiments, a roll-to-roll system may be configured for making electrode rolls with multiple mixture strips on a single current collector. This may be done by use of multiple manufacturing lines, each being configured for roll-on-roll laminated based electrode processing—e.g., being similar to one of the systems shown in FIG. 6 and FIG. 7. Alternatively, a roll-on-roll system such as those illustrated in FIGS. 6 and 7 may be modified to support processing of multiple-strip rolls—e.g., where the precursor composite film on carrier film has multiple strips of precursor composite, and with the system being configured to process the film such that the final product would have multiple strips in the electrode roll.

For example, as shown in FIG. 9, three strips of the mixture may be coated on the carrier or the current collector 902. After going through drying and curing, three strips of precursor composite films are present on the carrier or the current collector 902. The width of the carrier or the current collector may be about 300 mm to about 3200 mm, about 1300 mm to about 3200 mm. The width 903a of the coated mixture may be between about 300 mm to about 800 mm, preferably about 550 mm to about 555 mm, and the distance 903b between each strip of coated mixture may be between about 10 mm to about 60 mm, preferably about 15 mm. The coating speed for coating the mixture onto the carrier or the current collection may be between about 60 m/minute to about 100 m/minute, preferably 80 m/minutes.

Figure 10:
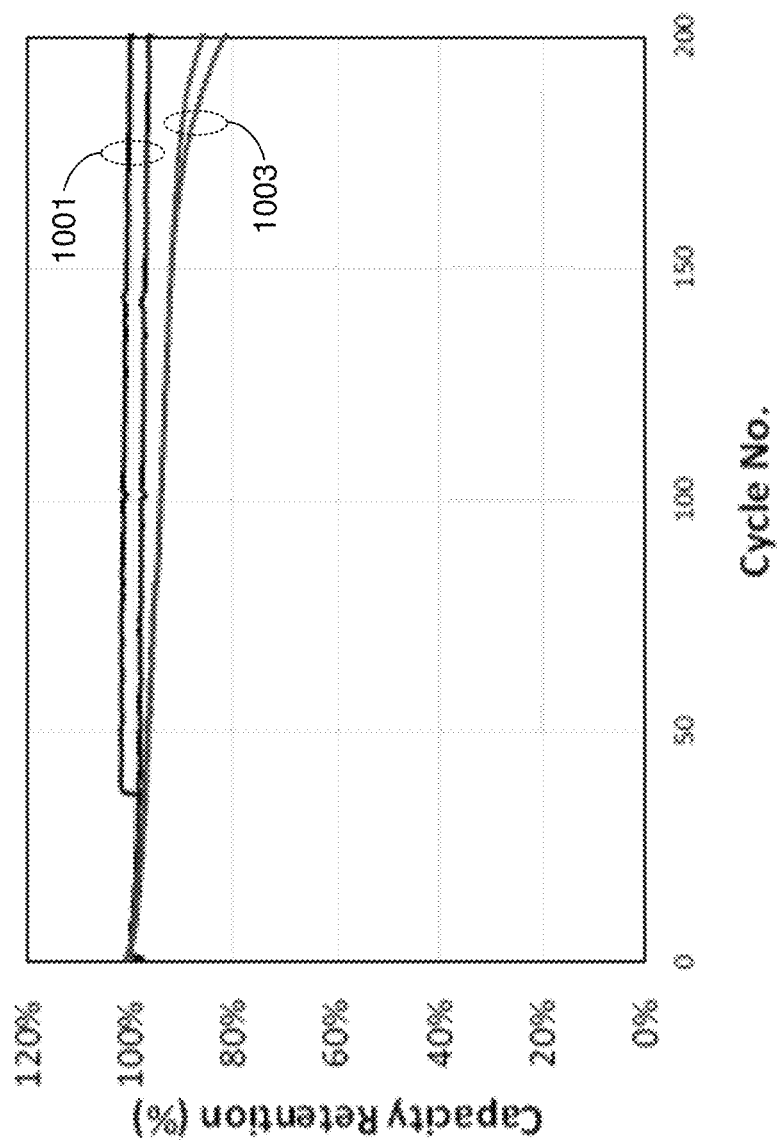
FIG. 10 is a plot illustrating cycle life performance for cells that use electrodes produced using high-volume lamination based roll-to-roll process, in accordance with an example embodiment of the disclosure.

FIG. 10 is a plot illustrating cycle life performance for cells that use electrodes produced using high-volume lamination based roll-to-roll process, in accordance with an example embodiment of the disclosure.

The plot shown FIG. 10 compares capacity retention, as a measure of cycle life performance, for cells corresponding to two different groups: group 1001 and group 1003. In this regard, group 1001 represents baseline cells—that is, cells produced using continuous batch process; whereas group 1003 represents cells incorporating electrodes produced using lamination based roll-to-roll process. The capacity retention for both cell groups is measured under 0.5 C charge to 4.2V and 0.5 C discharge to 3.3V (4.2V-3.3V(0.5 C/0.5 C)) test conditions. As shown in the plot in FIG. 11, cells with electrodes made using high volume lamination based roll-to-roll process exhibit comparable cycle life (capacity retention) performance as baseline cells.

Figure 11:
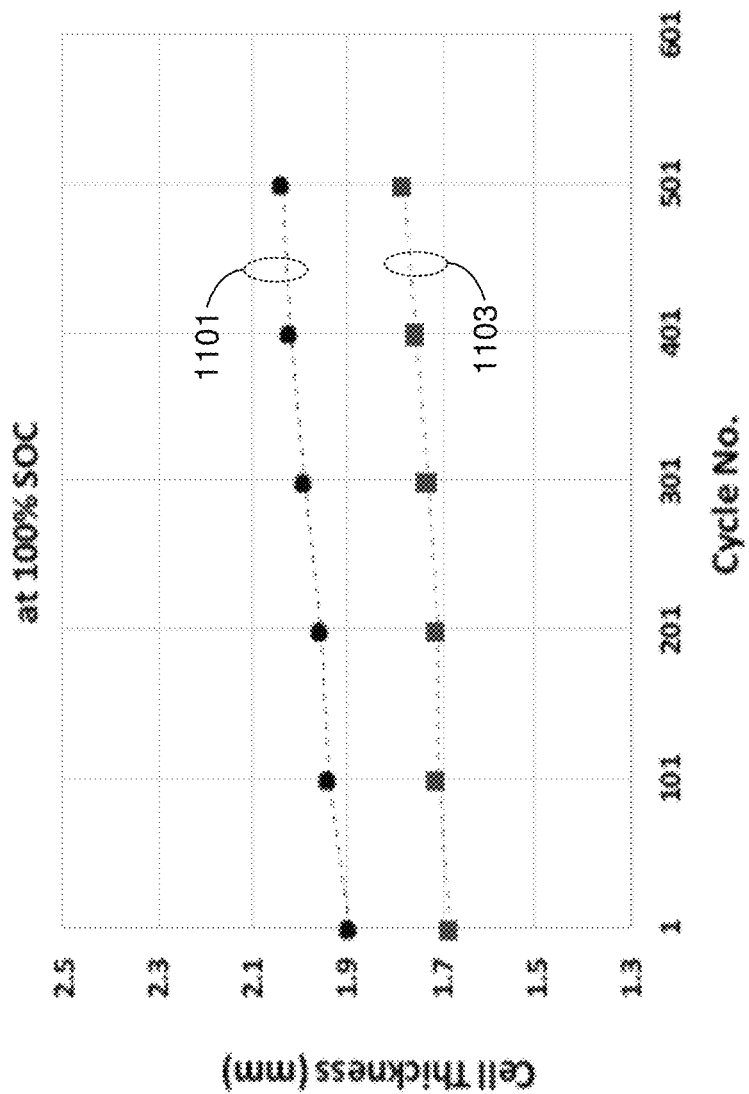
FIG. 11 is a plot illustrating cell thickness expansion performance for cells that use electrodes produced using high-volume lamination based roll-to-roll process, in accordance with an example embodiment of the disclosure.

FIG. 11 is a plot illustrating cell thickness expansion performance for cells that use electrodes produced using high-volume lamination based roll-to-roll process, in accordance with an example embodiment of the disclosure.

The plot shown FIG. 11 compares cell expansion, as measure of cell performance, for cells corresponding to two different groups: group 1101 and group 1103. In this regard, group 1101 represents baseline cells—that is, cells produced using continuous batch process; whereas group 1103 represents cells incorporating electrodes produced using lamination based roll-to-roll process. The cell expansion for both cell groups is measured based on changes in cell thickness against number of charge/discharge cycles. As shown in the chart in FIG. 11, cells with electrodes made using high volume lamination based roll-to-roll process exhibit comparable or better cell expansion compared to baseline cells.

An example system for continuous roll-to-roll electrode processing, in accordance with the present disclosure, comprises a plurality of carrier films, wherein each carrier film has applied thereon at a start of electrode processing in the system, at least one precursor composite film; one or more heat treatment ovens, wherein each heat treatment oven is configured for applying pyrolysis to at least one carrier film, to convert a corresponding precursor composite film on the carrier film to a pyrolyzed composite film; and a plurality of press rollers, wherein at least two of the plurality of press rollers are configured for pressing onto two sides of a current collector film, two pyrolyzed mixture films from two corresponding carrier films, to create a corresponding electrode composite film, wherein the two corresponding carrier films are separated after the pressing.

In an example embodiment, the at least one precursor composite film comprises silicon (Si).

In an example embodiment, the system further comprises a plurality of moving rollers, configured for moving the plurality of carrier films during the electrode processing in the system.

In an example embodiment, each heat treatment oven is configured to apply the pyrolysis at temperature >500° C.

In an example embodiment, each heat treatment oven is configured to apply the pyrolysis in reducing atmosphere.

In an example embodiment, each heat treatment oven is configured to create reducing atmosphere related conditions, the reducing atmosphere related conditions comprising at least one of inert atmosphere, a vacuum, flowing of one or more reducing gases.

In an example embodiment, the system further comprises at least one cleaning and inspection component configured for cleaning and inspecting electrode composite films after pressing.

In an example embodiment, the plurality of press rollers is configured to apply one or both of pressure and heat during the pressing.

In an example embodiment, each heat treatment oven is configured for applying pyrolysis to only one carrier film.

An method for electrode processing in a roll-to-roll system, in accordance with the present disclosure, comprises applying to each of a plurality of carrier films, at least one precursor composite film; applying pyrolysis to each of the plurality of carrier films, wherein the pyrolysis is configured for converting a corresponding precursor composite film on each carrier film to a pyrolyzed composite film; roll pressing onto two sides of a current collector film, two pyrolyzed mixture films from two corresponding carrier films, to create an electrode composite film; and separating the two corresponding carrier films after the pressing.

In an example embodiment, the method further comprises moving the plurality of carrier films during the electrode processing in the system using a plurality of moving rollers, configured for.

In an example embodiment, the method further comprises applying the pyrolysis at temperature >500° C.

In an example embodiment, the method further comprises applying the pyrolysis in a reducing atmosphere.

In an example embodiment, the method further comprises creating reducing atmosphere related conditions during the pyrolysis, the reducing atmosphere related conditions comprising at least one of inert atmosphere, a vacuum, flowing of one or more reducing gases.

In an example embodiment, the method further comprises cleaning and inspecting each electrode composite film after pressing.

In an example embodiment, the roll pressing comprises applying one or both of pressure and heat during the pressing.

In an example embodiment, the at least one precursor composite film comprises silicon (Si).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for electrode processing in a roll-to-roll system, the method comprising:
    applying to each of a plurality of carrier films, at least one precursor composite film;
    applying pyrolysis to each of the plurality of carrier films, wherein the pyrolysis is configured for converting a corresponding precursor composite film on each carrier film to a pyrolyzed composite film; and
    roll pressing onto two sides of a current collector film, two pyrolyzed mixture films from two corresponding carrier films, to create an electrode composite film.

2. The method of claim 1, comprising separating the two corresponding different carrier films of the plurality of carrier films after the pressing.

3. The method of claim 1, comprising moving the plurality of carrier films during the electrode processing in the system using a plurality of moving rollers.

4. The method of claim 1, comprising applying the pyrolysis at a temperature of >500° C.

5. The method of claim 1, comprising applying the pyrolysis in a reducing atmosphere.

6. The method of claim 5, comprising creating reducing atmosphere related conditions during the pyrolysis, the reducing atmosphere related conditions comprising at least one of an inert atmosphere, a vacuum, or flowing of one or more reducing gases.

7. The method of claim 1, comprising cleaning and inspecting each electrode composite film after pressing.

8. The method of claim 1, wherein the roll pressing comprises applying one or both of pressure and heat during the pressing.

9. The method of claim 1, wherein the at least one precursor composite film comprises silicon (Si).

* * * * *